(12) United States Patent
Salhoff

(10) Patent No.: US 7,959,214 B2
(45) Date of Patent: Jun. 14, 2011

(54) UNIT CARRIER FOR FITTING INTO A DOOR STRUCTURE OF A MOTOR VEHICLE DOOR

(75) Inventor: Thomas Salhoff, Hallstadt (DE)

(73) Assignee: Brose Fahrzeugteile GmbH & Co. KG, Coburg, Coburg (DE)

( * ) Notice: Subject to any disclaimer, the term of this patent is extended or adjusted under 35 U.S.C. 154(b) by 71 days.

(21) Appl. No.: 12/310,152

(22) PCT Filed: Jul. 20, 2007

(86) PCT No.: PCT/EP2007/006702
§ 371 (c)(1),
(2), (4) Date: Mar. 18, 2009

(87) PCT Pub. No.: WO2008/017395
PCT Pub. Date: Feb. 14, 2008

(65) Prior Publication Data
US 2010/0000156 A1 Jan. 7, 2010

(30) Foreign Application Priority Data
Aug. 11, 2006 (DE) .................... 20 2006 012 577 U

(51) Int. Cl.
*B60J 5/00* (2006.01)
(52) U.S. Cl. .................................................. 296/146.7
(58) Field of Classification Search ............. 296/146.7, 296/146.1; 224/326, 331, 309, 329; 24/297, 24/453; 411/41; 49/502
See application file for complete search history.

(56) References Cited

U.S. PATENT DOCUMENTS

| | | | | |
|---|---|---|---|---|
| 2,833,583 A | * | 5/1958 | Stone et al. | 292/340 |
| 4,923,542 A | * | 5/1990 | Janicki et al. | 156/92 |
| 5,419,606 A | * | 5/1995 | Hull et al. | 296/146.7 |
| 5,934,729 A | * | 8/1999 | Baack | 296/39.1 |
| 5,947,547 A | * | 9/1999 | Deeks et al. | 296/146.7 |

(Continued)

FOREIGN PATENT DOCUMENTS
DE 195 34 034 A1 3/1997
(Continued)

OTHER PUBLICATIONS

International Search Report, dated Nov. 13, 2007, corresponding to PCT/EP2007/006702.
(Continued)

*Primary Examiner* — Kiran B. Patel
(74) *Attorney, Agent, or Firm* — Christie, Parker & Hale LLP

(57) ABSTRACT

A unit carrier for fitting into a door structure of a motor vehicle door, on which functional components of the motor vehicle door may be premounted, so that the unit carrier, together with the functional components, may be fitted as a door module into the door structure, includes a surface of the unit carrier on the door structure side and fastening elements provided on the unit carrier. The fastening elements protrude from the surface of the unit carrier on the door structure side and engage in associated fastening points of the door structure, when the unit carrier is fitted into the door structure. The fastening elements are retained in a mounted position on the unit carrier before fitting the unit carrier into the door structure such that they do not protrude from the surface of the unit carrier on the door structure side.

28 Claims, 12 Drawing Sheets

U.S. PATENT DOCUMENTS

| | | | |
|---|---|---|---|
| 6,196,607 B1 * | 3/2001 | Gulisano | 296/39.1 |
| 6,378,931 B1 * | 4/2002 | Kolluri et al. | 296/146.15 |
| 6,381,906 B1 * | 5/2002 | Pacella et al. | 49/502 |
| 6,736,349 B1 * | 5/2004 | Boisdon et al. | 242/578 |
| 6,932,416 B2 * | 8/2005 | Clauson | 296/146.7 |
| 6,983,978 B2 * | 1/2006 | Radu et al. | 296/146.7 |
| 7,198,315 B2 * | 4/2007 | Cass et al. | 296/29 |
| 7,743,559 B2 * | 6/2010 | Papi et al. | 49/502 |
| 7,784,220 B2 * | 8/2010 | Wild | 49/503 |
| 2003/0097798 A1 * | 5/2003 | Staser | 49/502 |
| 2003/0230044 A1 * | 12/2003 | Peterson | 52/716.5 |
| 2006/0156631 A1 | 7/2006 | Koelle et al. | |
| 2007/0017159 A1 * | 1/2007 | Moore | 49/502 |
| 2007/0062123 A1 * | 3/2007 | Kruger et al. | 49/502 |
| 2007/0101658 A1 * | 5/2007 | Heyer | 49/502 |
| 2008/0219758 A1 * | 9/2008 | Jatzke | 403/282 |

FOREIGN PATENT DOCUMENTS

| | | |
|---|---|---|
| DE | 100 39 329 A1 | 2/2002 |
| DE | 102 01 651 A1 | 9/2003 |
| DE | 102 33 556 B4 | 2/2004 |
| EP | 1 096 156 A2 | 5/2001 |
| WO | WO 01/85477 A1 | 11/2001 |

OTHER PUBLICATIONS

English translation of International Preliminary Report on Patentability dated Feb. 17, 2009 for corresponding PCT Application No. PCT/EP2007/006702.

Chinese Examination Report dated Jul. 27, 2010 for Application No. 200780029836.2, 14 sheets.

* cited by examiner (A-A)

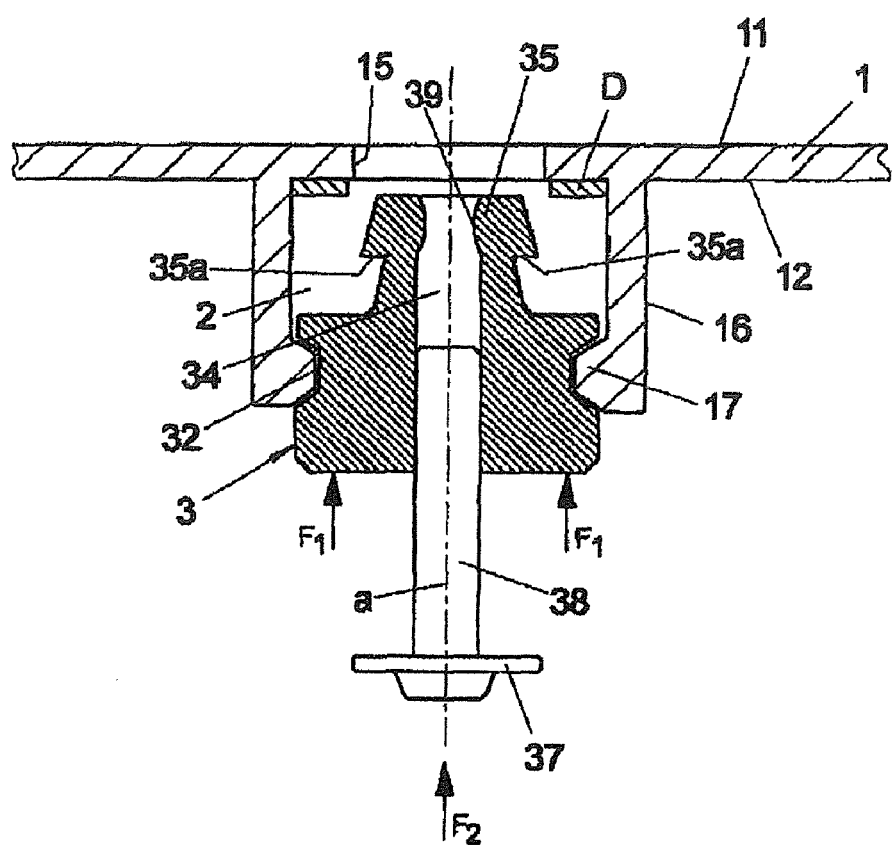

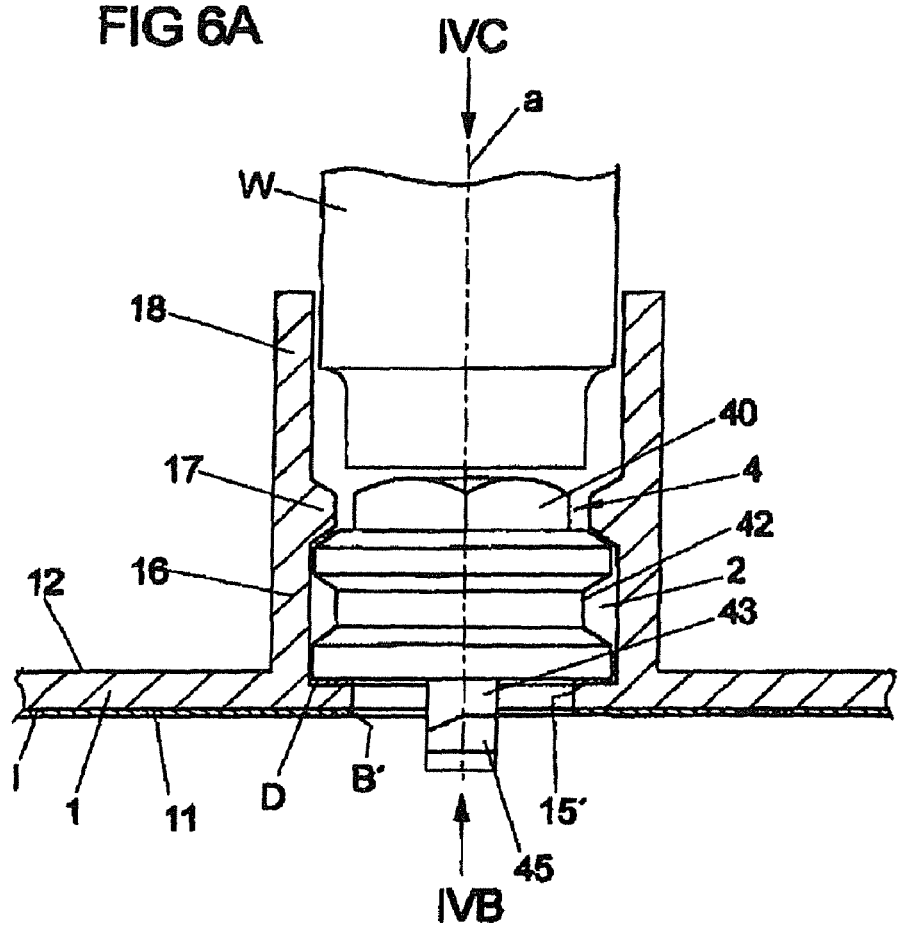
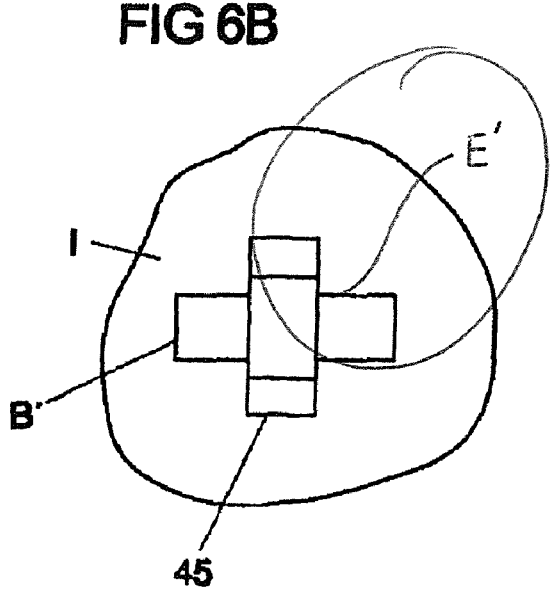

UNIT CARRIER FOR FITTING INTO A DOOR STRUCTURE OF A MOTOR VEHICLE DOOR

CROSS-REFERENCE TO A RELATED APPLICATION

This application is a National Phase Patent Application of International Patent Application Number PCT/EP2007/006702, filed on Jul. 20, 2007, which claims priority of German Utility Model Application Number 20 2006 012 577.9, filed on Aug. 11, 2006.

BACKGROUND

The invention relates to a unit carrier for fitting into a door structure of a motor vehicle door.

Functional components of a motor vehicle door, such as for example a window lifter, a lock subassembly, an airbag module, a speaker and the like, may be premounted on such a unit carrier, so that the unit carrier together with the functional components premounted thereon may be fitted as a complete, and possibly pretested, door module into the door structure.

The door structure which is provided for fitting the unit carrier may comprise, for example, a door inner skin with a large-surface cutout which is overlapped by the unit carrier in the fitted state. The unit carrier thus bears with its one surface on the door structure side along the edge of the large-surface cutout against the door structure, more specifically the door inner skin, and is fixed via fastening elements, which protrude from the surface of the unit carrier on the door structure side and engage in associated fastening points of the door structure, i.e. in particular in fastening points on the edge of the large-surface cutout of a door inner skin. The unit carrier is secured thereby to the door structure.

To this end, it is known to overlap mutually associated fastening points on the unit carrier, on the one hand, and on the door structure, on the other hand, and subsequently to connect the unit carrier at said fastening points to the door structure, namely by fastening screws which penetrate mutually associated fastening points on the unit carrier, on the one hand, and on the door structure, on the other hand. Moreover, clip elements or expanding elements, in particular in the form of plugs, may also be used as fastening elements.

Within the context of combining as many functional components as possible of a motor vehicle door, it is desirable to have already previously premounted on the unit carrier fastening elements which are used for fastening the unit carrier to the door structure, so that the unit carrier together with the fastening elements may be positioned on the door structure and the fastening means on the unit carrier side may be brought into engagement with fastening points on the door structure side.

In this connection, however, there is the problem that, when fitted into a motor vehicle door, a unit carrier generally may not simply be positioned on the door structure perpendicular to the door plane, but frequently a movement of the unit carrier is required along the door plane so that, when fitting the unit carrier, it is possible to transfer a lock subassembly premounted on the unit carrier into its operational position on the door structure.

SUMMARY

The object of the invention, therefore, is to provide a unit carrier of the aforementioned type which, together with a high degree of integration of functional components of a motor vehicle door, simultaneously permits easy fitting into a door structure.

According to an exemplary embodiment of the invention the fastening elements which are used for fastening the unit carrier to a door structure are retained in a mounted position on the unit carrier before fitting the unit carrier into the door structure such that they do not protrude from the surface of the unit carrier on the door structure side (i.e. facing the door structure), one respective through-passage being associated with the fastening elements on the unit carrier, through which the respective fastening element may be moved from its mounted position into a fastened position, in which it protrudes from the surface of the unit carrier on the door structure side, so that it is in engagement with an associated fastening point of the door structure.

The exemplary solution according to this exemplary embodiment of the invention thus permits a premounting on the unit carrier of fastening elements which are used for fastening the unit carrier to a door structure, without said fastening elements, which protrude in their fastened position from the surface of the unit carrier on the door structure side, hindering the fitting of the unit carrier into a door structure, in particular even when the unit carrier, when fitted into the door structure, has to be moved along the door plane. Thus the fastening elements are initially located in a mounted position on the unit carrier, in which they do not protrude from the surface of the unit carrier on the door structure side.

Exemplary, the fastening elements are respectively retained at the edge of the associated through-passage in their respective mounted position, the retention being such that it may be canceled with the action of sufficiently large forces by an axial movement and/or rotational movement of the respective fastening element, so that the fastening element may be transferred by an axial movement, a rotational movement or a combination of these two movements into its fastened position, in which it is in engagement with an associated fastening point of the door structure.

According to one exemplary embodiment of the invention, the respective fastening elements are positively retained on the associated through-passage, and namely in particular by means of a latching connection, which is configured to be at least partially elastic, so that the latching connection may be released by acting on the respective fastening element when fastening the unit carrier to a door structure. One respective latching connection may, for example, be formed by a latching projection (protruding inwardly from the wall of one respective through-passage), which engages in an associated latching recess (on the respective fastening element), a release of the latching connection being possible by an elastic configuration of the latching projection and with the action of sufficiently large forces.

According to a further exemplary embodiment of the invention, the respective fastening element in its mounted position is pressed into the associated through-passage, so that it is retained thereon by a frictional connection.

In a further exemplary embodiment of the invention it may be provided that the fastening elements are respectively retained by a material connection at the edge of the associated through-passage, for example by an adhesive means or by welding points (ultra-sound welding).

Finally, one respective fastening element may also be integrally formed in one piece, for example injection-molded, at the edge of the associated through-passage, in the event of a unit carrier consisting of plastics.

According to an exemplary development of the invention, on the second surface of the unit carrier remote from the surface on the door structure side, guide regions are provided which are used for receiving at least one portion of each of the fastening elements in its mounted position, said guide regions preferably being formed by at least one respective annular peripheral (but not necessarily uninterrupted continuous) defining wall, and which enclose a space provided for receiving an associated fastening element.

Insofar as the guide regions protrude from the second surface of the unit carrier remote from the surface on the door structure side, the associated fastening elements, for example on their actuating head, preferably comprise a recess, which is used for receiving the guide region when the respective fastening element is in its fastened position.

The guide regions respectively form a component of the through-passages, in which one respective fastening element may be received in its mounted position. To this end, each of the guide regions is aligned with a through-opening of the unit carrier, so that the respective through-opening together with the associated guide region forms a through-passage for a fastening element.

The fastening elements are preferably configured such that they engage in their fastened position in each associated fastening opening of the door structure, when the unit carrier is fitted into the door structure, and namely preferably such that for producing a connection the fastening elements overlap the respective associated fastening opening at the edge.

To this end, the fastening elements may, for example, be configured as expandable elements in the form of plugs which may be expanded by an associated actuating element, for example in the form of an actuating screw or a pin.

The actuating elements may in this case be already pre-mounted on the respective expandable element, if said expandable element is still in its mounted position.

On the other hand, the fastening elements may be designed such that they may be moved by a rotational movement, possibly by superimposing a longitudinal movement, from their mounted position into their fastened position, in order to bring said fastening elements into engagement with fastening points on the door structure side.

If non-rotationally symmetrical fastening openings, for example in the form of slots, are provided on the door structure, the rotatable fastening elements may be configured for forming a bayonet closure, by said fastening elements being able to be moved by a rotational movement from a first rotational position in which they may be passed through the associated fastening opening by a fastening portion in the form of a closure head, into a different rotational position in which they overlap the associated fastening opening with the closure head at the edge.

In an exemplary development of the invention, means are provided for preventing a rotational movement of the fastening elements in their fastened position. It is intended to be ensured thereby that the fastening elements, after they have been transferred into their fastened position, also remain therein. To this end, for example, mutually associated stops may be used on the respective fastening element, on the one hand, as well as on the wall of the associated through-passage, on the other hand.

Exemplary, at least one portion of the stops is configured to be elastic, so that with the action of a sufficiently large torque the stops may be overcome and a rotational movement of the fastening elements may be produced, namely in order to be able to release the unit carrier from the door structure in the event of repair and/or maintenance.

BRIEF DESCRIPTION OF THE DRAWINGS

Further details and advantages of the invention will become clear in the following description of exemplary embodiments with reference to the figures, in which:

FIG. 1b shows a cross section through the fastening element of FIG. 1a.

FIG. 3a shows a modification of the arrangement of FIG. 1a.

FIG. 3b shows a longitudinal section through the arrangement of FIG. 3a.

FIG. 5a shows a second embodiment of an arrangement according to FIG. 1a.

FIG. 5b shows a first view of the arrangement of FIG. 5a.

FIG. 5c shows a second view of the arrangement of FIG. 5a.

FIG. 6a shows the arrangement of FIG. 5a after fastening the unit carrier to a door structure.

FIG. 6b shows a first view of the arrangement of FIG. 6a.

FIG. 6c shows a second view of the arrangement of FIG. 6a.

Figure 1A:
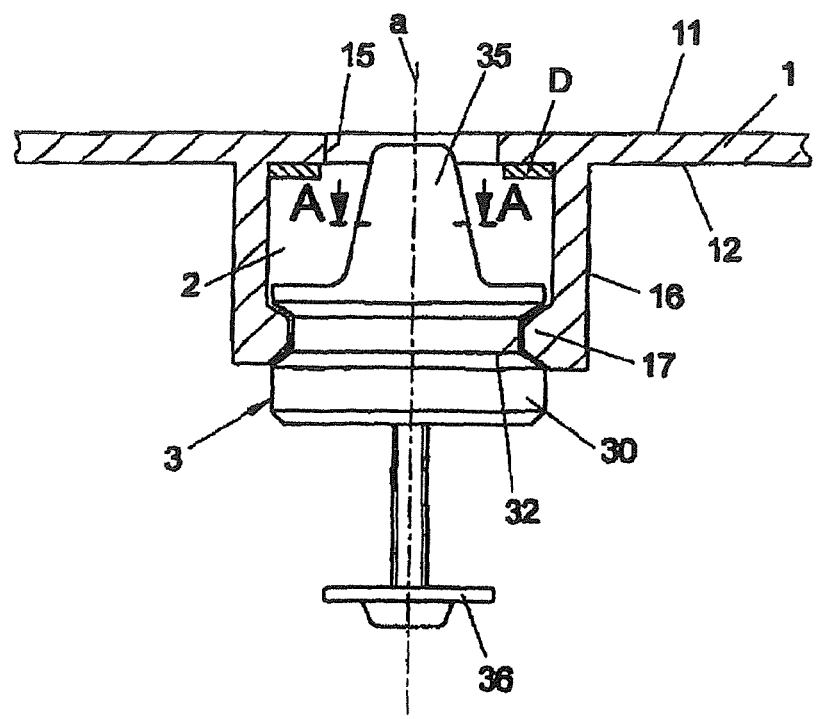
FIG. 1a shows a detail of a unit carrier for fitting into a motor vehicle door in the region of a fastening element, which is provided for fastening the unit carrier to a door structure, in a sectional view.

DESCRIPTION OF THE REFERENCE NUMERALS a. Axial direction;
A. Large-surface cutout;
B. Fastening points (on door inner skin I);
B'. Fastening points (on door inner skin I);
D. Sealing element;
E. Edge (of through opening);
E' Edge (of fastening opening B');
$F_1$. Force;
$F_2$. Force;
I. Door inner skin;
S. Fastening points (on unit carrier T);
T. Door module carrier;
W. Tool;
X. Door structure;
1. Unit carrier;
2. Through passage;
3. Fastening element;
4. Fastening element;
Fastening element;
11. First surface;
12. Second surface;
15. Through-opening;
15'. Through-opening;
16. Guide region;
Latching projection;
18. Extension;
19. Projection;
30. Actuating head;
32. Latching recess;
34. Through-passage;
35. Deformable expanding region;
35a. Undercut;

36. Actuating element (actuating screw);
37. Actuating element;
38. Shank;
39. Inwardly protruding bulged portion;
40. Actuating head;
40a. Internal polygon;
42. Latching recess;
17, 42 Latching connection (clip connection);
43. Shank;
45. Fastener head (closure head);
49. Projection;
50. Actuating head;
50a. Internal polygon;
51. Peripheral recess;
53. Shank;
55. Fastening head;
58. Peripheral phase

DETAILED DESCRIPTION

Figure 9:
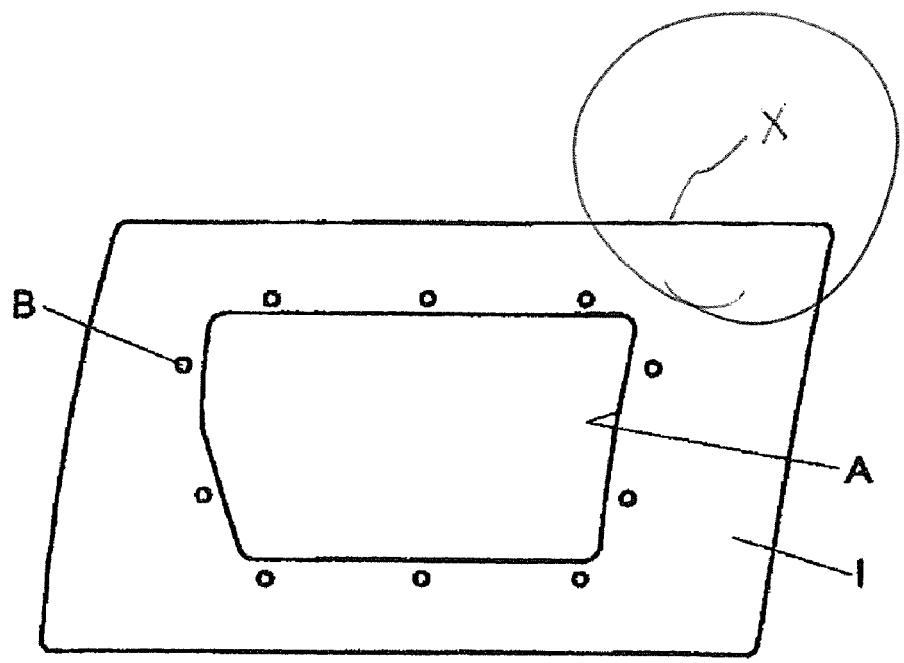
FIG. 9 shows a schematic view of a door inner skin of a motor vehicle door as well as a unit carrier to be fastened thereto.
Figure 9:
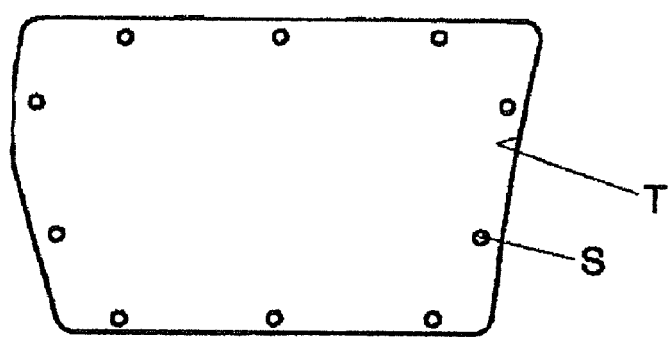

FIG. 9 shows schematically a door inner skin I of a motor vehicle door V, which is provided with a large-surface cutout A. Such a door inner skin I forms a component of the door structure X of a motor vehicle door, and in particular a component of a so-called wet/dry space partition, by which the wet space is separated in a moisture-tight manner from the dry space of the motor vehicle door.

To this end, the large-surface cutout A of the door inner skin I is overlapped by a door module carrier T, which bears at the edge of the large-surface cutout A against the door inner skin I and is connected at that point to the door inner skin I via mutually associated fastening points B, S on the door inner skin I, on the one hand, and on the unit carrier T, on the other hand.

FIG. 1a shows a detail of a unit carrier 1 for a motor vehicle door—preferably consisting of plastics—of the type shown in FIG. 9, on which various functional components of the motor vehicle door, such as for example a window lifter, a lock subassembly, an airbag module, a speaker system and the like may be premounted and which, together with the functional components premounted thereon, may be fitted into the door structure of the corresponding motor vehicle door as a completely prefabricated, and possibly also pretested, door module.

The unit carrier 1 has a first surface 11 on the door structure side and a second surface 12 remote therefrom. The surface 11 on the door structure side, in the fitted state of the unit carrier, faces those regions of the door structure to which the unit carrier 1 is fastened.

The unit carrier 1 may, for example, be fastened to a so-called door inner skin of a motor vehicle door as a component of the door structure. The door inner skin preferably has, to this end, a large-surface cutout which is overlapped by the unit carrier 1, if said unit carrier is fastened to the door inner skin, the fastening of the unit carrier 1 to the door inner skin taking place via fastening elements, to which fastening points are associated along the edge of the large-surface cutout of the door inner skin.

FIG. 1a shows a fastening element 3 (preferably consisting of plastics) in the form of an expandable element which may be used for fastening the unit carrier 1 to a door structure, in particular a door inner skin of a motor vehicle door. The fastening element 3 has an actuating head 30 as well as a fastening portion attached thereto in the form of a deformable expanding region 35, which by means of an actuating element 36 in the form of an actuating screw which may be inserted from the actuating head 30 into the fastening element 3 may be expanded such that it may cooperate in the manner of a plug with an associated fastening opening of the door structure (door inner skin) of a motor vehicle door.

In the state shown in FIG. 1a, however, the fastening element 3 is still in its mounted position in which it does not protrude from the first surface 11 of the unit carrier 1 on the door structure side, and thus is not yet able to engage in an associated fastening opening of the door structure, in particular the door inner skin. For retaining the fastening element 3 in its mounted position, on the second surface 12 of the unit carrier 1 a guide region 16 is provided which is formed by an annular wall formed integrally on the unit carrier 1 protruding from the second surface 12 thereof. Within the (enclosed) space defined by the annular wall at least one part of the fastening element 3 is arranged, for the positive retention of the fastening element 3 in its mounted position at least one latching projection 17 (for example in the form of a snap hook) protruding inwardly from the inner face of the annular wall defining the guide region 16 and engaging in at least one associated latching recess 32 of the fastening element 3.

Figure 2:
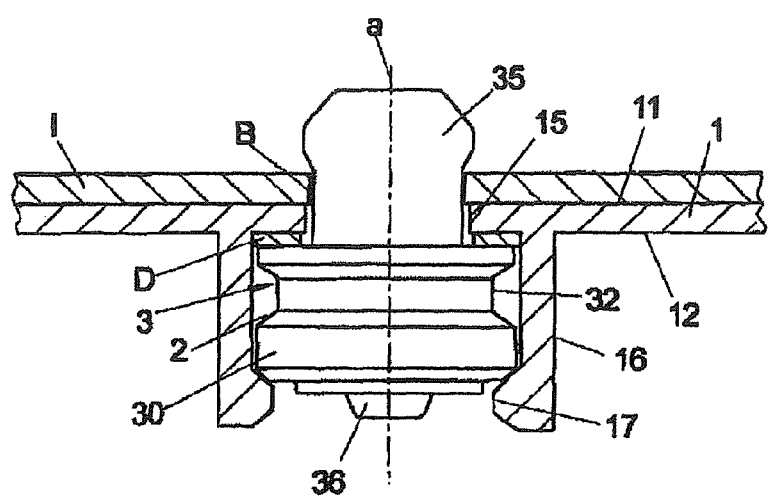
FIG. 2 shows a view according to FIG. 1a after fastening the unit carrier to a door structure.

The latching projection 17 is additionally configured to be sufficiently elastic, so that with the action of a force on the fastening element 3, which exceeds a specific minimum value, the latching projection 17 may be brought out of engagement with the associated latching recess 32, and the fastening element 3 may be transferred from the mounted position shown in FIG. 1a into the fastened position shown in FIG. 2.

Figure 1B:
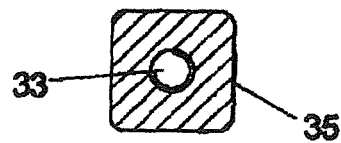

The outer contour of the fastening element 3 (on the outer periphery thereof) is in this case, according to FIG. 1b, selected such that the fastening element 3, with the subsequent penetration of the through-opening 15 and a fastening opening B on the door inner skin I of a door structure, see FIG. 2 (fastened position of the fastening element 3), may not be rotated therein. To this end, the outer contour of the fastening element 3 has a polygonal shape. The inner contour of at least one of the aforementioned openings 15, B is adapted thereto such that the fastening element 3 in the form of an expandable element may be retained therein in a rotationally fixed manner in its fastened position.

For transferring the fastening element 3 from the mounted position shown in FIG. 1a in which it does not protrude over the first surface 11 of the unit carrier 1 on the door structure side (or at most slightly protrudes thereover), into the fastened position shown in FIG. 2, in which the fastening element 3 protrudes with its expanding region 35 from the first surface 11 of the unit carrier 1 on the door structure side, and engages in an associated fastening opening B on the door inner skin I of a door structure (for example in the form of a door inner panel) an actuating element 36 in the form of an actuating screw is used, which preferably is premounted as a plastic screw on the fastening element 3.

By screwing the actuating screw 36 into the expanding element 3, a force is exerted thereon in the axial direction a, i.e. in the direction of extension of the screw shank as well as the central axis of the guide region 16. This force in the axial direction a causes a release of the latching connection between the latching projection 17 on the guide region side and the latching recess 32 on the fastening element side, so that the fastening element 3 is moved in the axial direction a along the guide region 16 in the direction of the second surface 12 of the unit carrier 1. In this connection, the expanding region 35 of the fastening element 3 passes through a through-opening 15 provided on the unit carrier 1 and aligned with the guide region 16. The through-opening 15 thus forms together with the guide region 16 a through-passage 2 for the fastening element 3, in which the fastening element 3 may be displaced from its mounted position shown in FIG. 1a into the fastened position shown in FIG. 2.

With the displacement of the fastening element 3 in the axial direction a, said fastening element comes to bear with an annular peripheral sealing element D which is arranged inside the guide region 16, and which is located between the actuating head 30 of the fastening element 3 and the second surface 12 of the unit carrier 1 and is pressed by the actuating head 30 against said second surface 12. As a result, the through-opening 15 of the unit carrier 1 is sealed, so that no moisture may pass through the through-opening 15. This is particularly important if the unit carrier 1 together with the associated door inner skin I forms a component of a so-called wet/dry space partition of a motor vehicle door, which separates the dry space on the vehicle interior side from the wet space of a motor vehicle door on the vehicle exterior side.

With the axial displacement of the fastening element 3, said fastening element not only passes through the through-opening 15 of the unit carrier 1 but also through the fastening opening B of the door inner skin I aligned therewith, to which the unit carrier 1 is to be fastened. To this end, the unit carrier 1 during mounting is to be aligned accordingly relative to the door inner skin I.

Moreover, the expanding region 35 of the fastening element 3, when screwing-in the actuating screw 36, is radially expanded, so that it overlaps the fastening opening B in the door inner skin I at its edge. As a result, the expanding region 35 of the fastening element 3 is engaged with the associated fastening point of the door inner skin I formed by the fastening opening B so that the unit carrier 1 at this point is fastened according to the plug principle to the door inner skin I. With the deformation (expansion) of the expandable region 35 of the fastening element 3, moreover, a contact pressure is generated which presses the actuating head 30 of the fastening element 3 (by the interposition of the seal D) against the second surface 12 of the unit carrier 1.

By fastening the unit carrier 1 to the door inner skin I at a plurality of points according to the fastening principle shown in FIG. 2, the unit carrier 1 is permanently fixed to the door inner skin I.

It is advantageous if, when fitting the unit carrier 1 into a door structure in the initial mounting phase, the fastening elements 3 are initially still respectively arranged in the mounted position shown in FIG. 1a, in which they do not protrude from the surface 11 of the unit carrier 1 on the door structure side. This permits a free displaceability of the unit carrier 1 during mounting along the door plane spanned by the door inner skin I, namely in order to position in a defined manner a lock subassembly which is premounted on the unit carrier 1, when fitting the unit carrier 1 into the door structure. After the unit carrier 1 has been aligned relative to the door inner skin I, the fastening elements 3, as disclosed with reference to FIGS. 1a and 2, are thus transferred from their mounted position shown in FIG. 1a into the fastened position shown in FIG. 2, and namely by means of the actuating elements 36 provided therefor in the form of actuating screws.

Figure 3A:
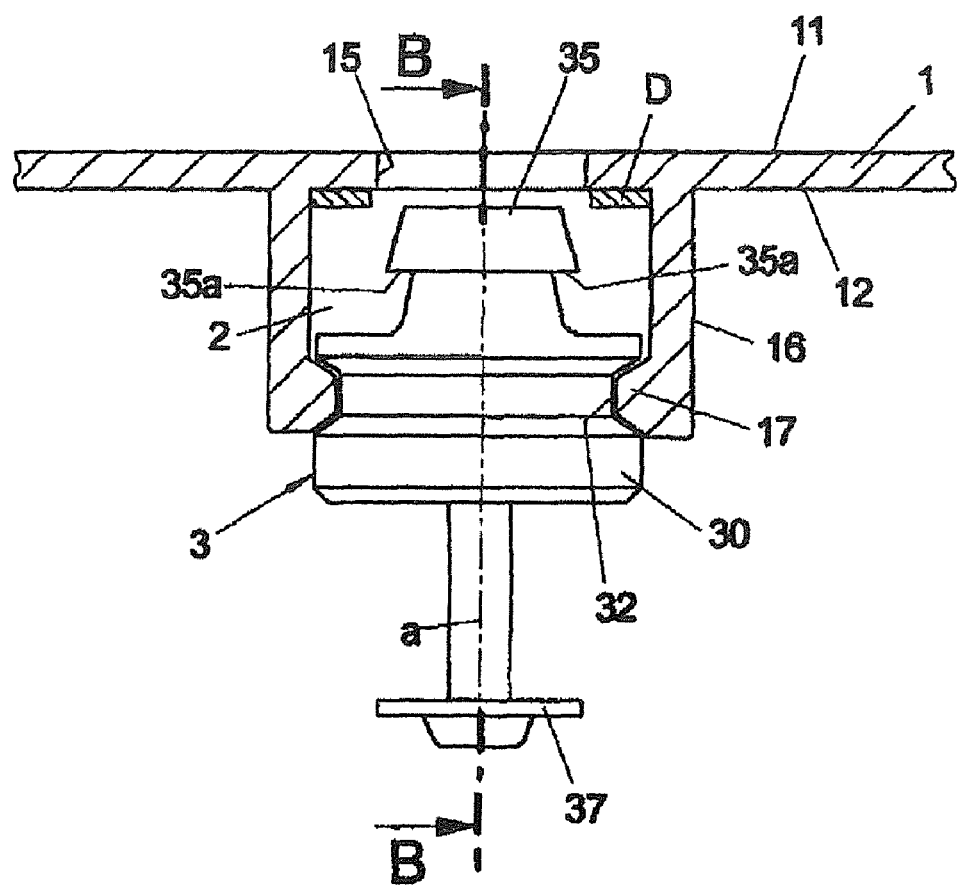

In FIGS. 3a and 3b a development of the arrangement of FIGS. 1a and 1b is shown, which is explained hereinafter with reference to the differences relative to the arrangement of FIGS. 1a and 1b.

Figure 4:
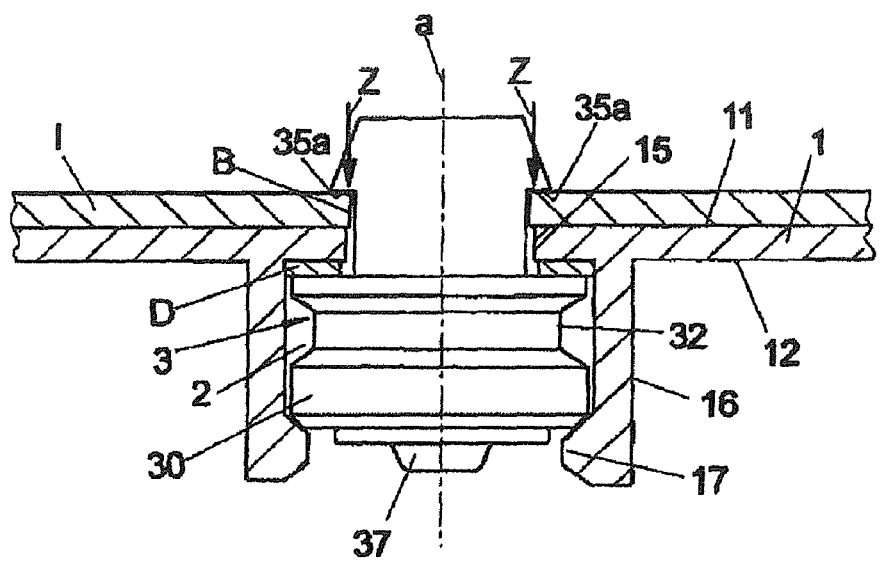
FIG. 4 shows a view according to FIG. 3a after fastening the unit carrier to a door structure.

A first difference is that, according to FIGS. 3a and 3b, the expanding region 35 of the fastening element 3 is provided from the start, i.e. already before its deformation by the associated actuating element 37, with at least one undercut 35a, which is configured and provided in the fastened position shown in FIG. 4 of the fastening element 3 to engage behind the edge of a fastening opening B of a door inner skin I penetrated by the fastening element 3.

A further difference is that the actuating element 37 associated with the fastening element 3 is not configured as a screw but as a pin, which is retained with its shank 38 by a frictional connection against the inner wall of a through-passage 34 configured in the fastening element 3, extending in the axial direction a.

In the expanding region 35 of the fastening element 3 the wall of the through-passage 34 is provided with an inwardly protruding bulged portion 39, on which the shank 38 of the actuating element 37 acts with a movement in the axial direction a such that the expanding region 35 is outwardly expanded in the radial direction, i.e. perpendicular to the axial direction a.

For transferring the fastening element 3 from the mounted position shown in FIGS. 3a and 3b into the fastened position shown in FIG. 4—according to the arrangement of the unit carrier 1 on a door inner skin I, the through-opening 15 of the unit carrier 1 associated with the fastening element 3 being aligned with an associated fastening opening B of the door inner skin I—initially a force $F_1$ is exerted in the axial direction a on the fastening element 3. As a result, as already disclosed with reference to FIGS. 1a to 2, the provisional fixing of the fastening element 3 is achieved in its mounted position, by the latching projection 17 on the unit carrier side being brought out of engagement with the latching recess 32 on the fastening element side. This permits a movement of the fastening element 3 (together with the actuating element 37 retained thereon by a frictional connection) in the axial direction a, until the expanding region 35 of the fastening element 3 in the axial direction a is guided behind the fastening opening B of the door inner skin I.

Subsequently, a force $F_2$ is exerted on the actuating element 37 associated with the fastening element 3, so that said actuating element moves in the axial direction a toward the inwardly protruding bulged portion 39 on the wall of the through-passage 34 configured in the fastening element 3. As soon as the actuating element 37 comes into engagement with its shank 38 with said bulged portion 39, the expanding region 35 of the fastening element 3 in the radial direction, i.e. perpendicular to the axial direction a, is expanded outwardly, so that said fastening element overlaps the fastening opening B of the door inner skin I at the edge and namely specifically with the undercuts 35a already preformed on the expanding region 35.

As a result of the disclosed deformation of the expanding region 35 of the fastening element 3, triggered by the cooperation of the shank 38 of the actuating element 37, with the inwardly bulged region 39 of the wall of the through-passage 34 of the fastening element 3, a tensile force Z is exerted on the expanding region 35 of the fastening element 3, which presses the portions of the expanding region 35 overlapping the fastening opening B at its edge against said edge. As a result, the sealing action is further reinforced for the sealed closure of the through-opening 15 and the fastening opening B.

Figure 5A:
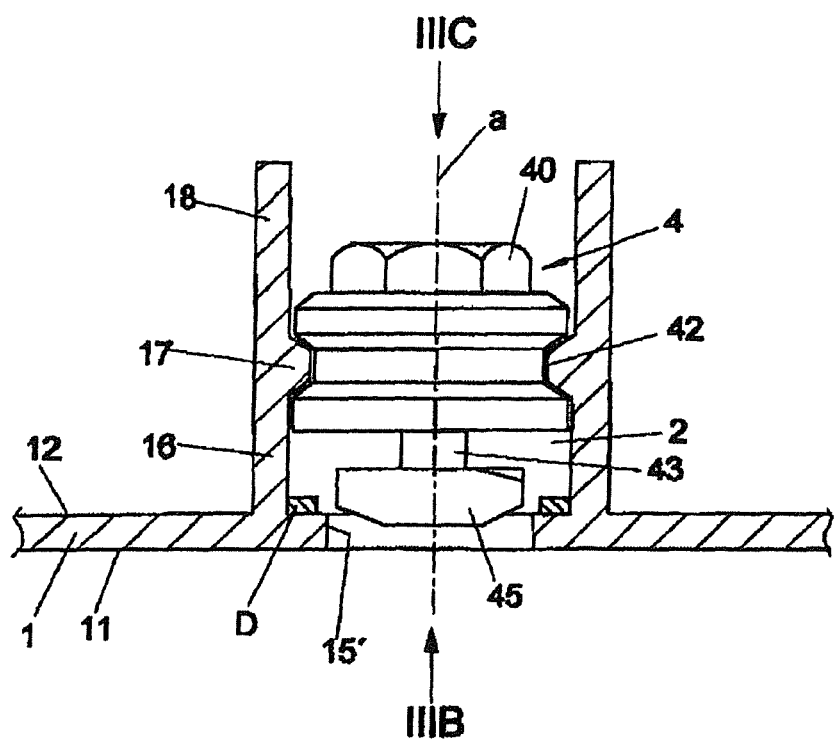
Figure 5B:
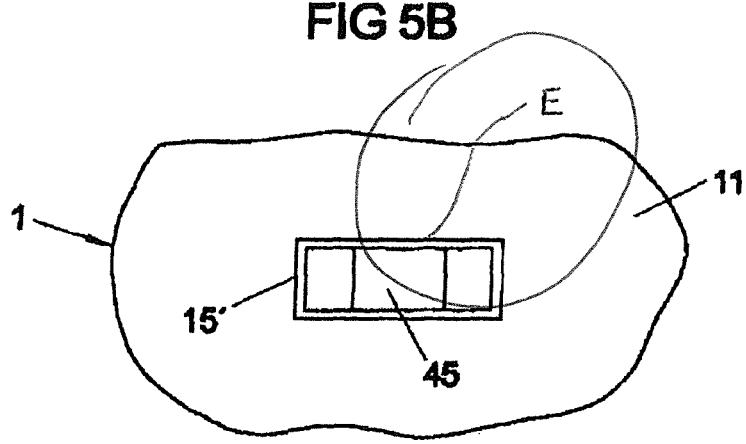
Figure 5C:
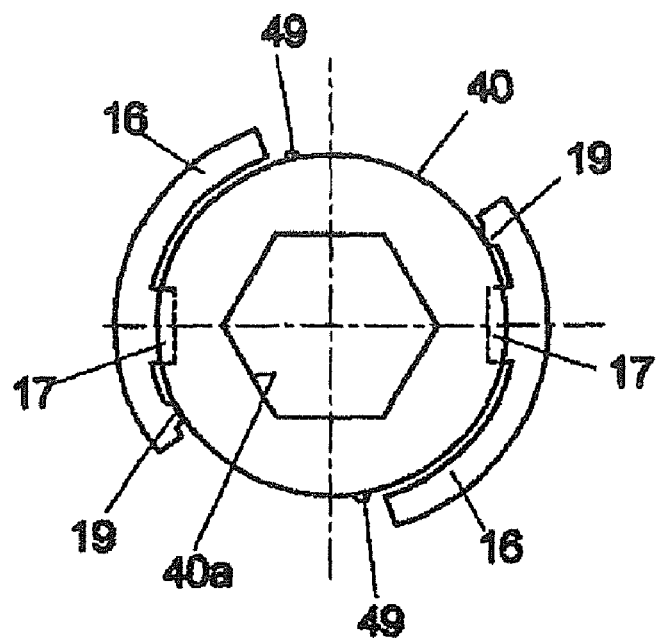

FIGS. 5a to 5c show a further modification of the arrangement of FIG. 1a and namely, in particular, with regard to the design of the fastening element 4. Hereinafter, details will be primarily provided about those aspects of the arrangement of FIGS. 5a to 5c in which said aspects differ from the arrangement according to FIG. 1a. Moreover, reference is made to the description of FIG. 1a, coinciding components in FIG. 1a, on the one hand, as well as FIGS. 5a to 5c, on the other hand, being respectively denoted by identical reference numerals.

According to FIGS. 5a to 5c, the fastening element 4 is configured for producing a bayonet closure. To this end, said bayonet closure comprises, on the one hand, an actuating head 40 with an internal polygon 40a, so that the fastening element 4 may be rotated by applying a torque with a suitable tool engaging in the internal polygon 40a.

At its end remote from the actuating head 40, and thus connected via a shank 43, the fastening element 4, on the other hand, has as a fastening region a fastening head 45 (closure head) for producing a bayonet closure. Said fastening head replaces in the present embodiment the fastening region 35 in the form of an expanding region of the fastening element 3 of FIG. 1a.

As may be seen in particular with reference to FIG. 5b, the fastening head 45 of the fastening element 4 is configured to be rectangular in cross section and protrudes into a through-opening 15' of the unit carrier 1 also configured to be rectangular in cross section, without penetrating said through-opening so that the fastening element 4 does not protrude over the first surface 11 of the unit carrier 1 on the door structure side. As a result, the fastening element 4 is received in a rotationally locked manner in the through-passage 2 formed by the through-opening 15' and the guide region 16.

As in the case of the embodiment of FIG. 1a, in this case the fastening element 4 is also retained positively in a guide region 16, which protrudes from the second surface 12 of the unit carrier 1 and is integrally formed thereon, by at least one elastic latching projection 17 formed on the guide region 16 engaging in at least one associated latching recess 42 of the fastening element 4.

The guide region 16 in the present example is lengthened in the axial direction a—compared with the exemplary embodiment of FIG. 1a—so that an extension 18 of the guide region 16 may be used for guiding a tool W, see FIG. 6a, by means of which the fastening element 4 may be actuated on the actuating head 40.

With reference to FIG. 5c, it is clear that the annular wall defining the guide region 16 is not configured to be entirely peripheral, but instead is formed by two opposing wall portions. This simplifies the possibility of unmolding a casting tool used for producing the unit carrier 1.

Moreover, with reference to FIG. 5c, it may be seen that two projections 49 used as stops protrude radially outwardly from the actuating head 40 of the fastening element 4, to which in turn corresponding projections 19 on the inner wall of the guide region 16 are associated. The projections 19, 49 serve for rotationally locking the fastening element 4, if said fastening element is in its fastened position shown in FIGS. 6a to 6c. In the mounted position shown in FIGS. 5a to 5c, the fastening element 4 is accordingly secured, as already shown, against inadvertent rotation, as the fastening head 45 thereof which is rectangular in cross section engages in the slot-like through-opening 15' of the unit carrier 1 which is rectangular in cross section.

Figure 6C:
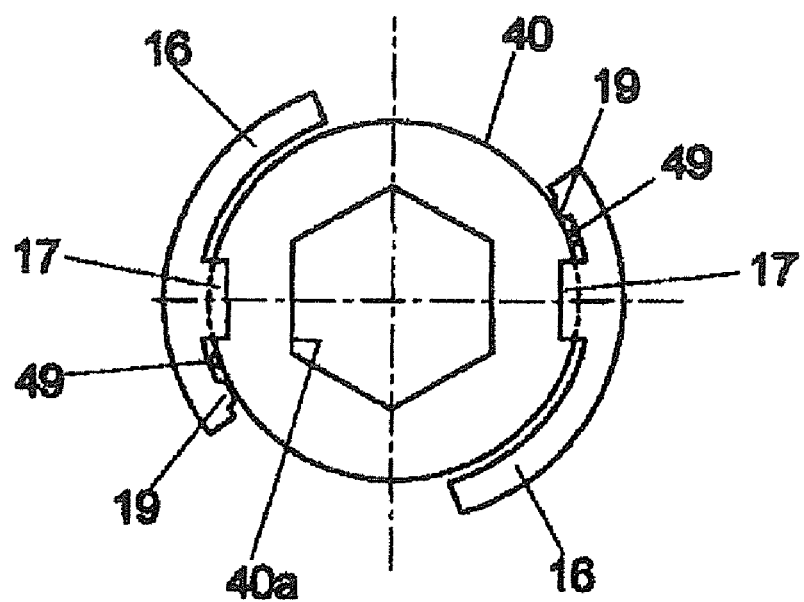

For transferring the fastening element 4 from the mounted position shown in FIGS. 5a to 5c, into the fastened position shown in FIGS. 6a to 6c, in order thereby to fasten the unit carrier 1 to fastening points B' of a door inner skin I provided therefor, a suitable tool W is brought into engagement with the actuating head 40 of the fastening element 4, and thus exerts a force in the axial direction a.

By exerting force in the axial direction a, initially the latching connection 17, 42 (clip connection) is released between the fastening element 4 and the guide region 16, so that the fastening element 4 may be displaced in the axial direction a, until it bears with its actuating head 40 via a seal D bearing against the edge E of the through-opening 15' against the second surface 12 of the unit carrier 1.

In this connection, the fastening element 4 penetrates with its fastening head 45 the fastening opening B' provided in the door inner skin I, and which is also configured to be rectangular in cross section in a similar manner to the associated through-opening 15' of the unit carrier 1 and is substantially congruent therewith. The fastening element 4 protrudes, as shown in FIG. 6a, with its fastening head 45 from the edge E' of the fastening opening B' of the door inner skin I.

By a subsequent rotational movement of the fastening element 4 (by 180°) the actuating head 45 thereof is transferred into a rotational position, see FIG. 6b, in which it is oriented toward the fastening opening B' of the door inner skin I such that it overlaps said fastening opening in the manner of a bayonet closure at its edge. As a result, a positive connection is produced between the unit carrier 1 and the door inner skin I.

As is clear from FIG. 6c, the fastening element 4 in the rotational position shown in FIG. 6b, in which it overlaps the associated fastening opening B' at its edge, is secured by the mutually cooperating projections 19, 49 defining stops on the guide region 16, on the one hand, and on the fastening element 4, on the other hand. At least one portion of these projections 19, 49 is, however, configured to be elastic so that with the action of a sufficiently large torque on the fastening element 4, the rotational locking may be canceled, so that the connection between the unit carrier 1 and the door inner skin I may again be released, namely in order to be able to dismantle the unit carrier 1 from the door structure in the event of repair or maintenance.

Figure 7:
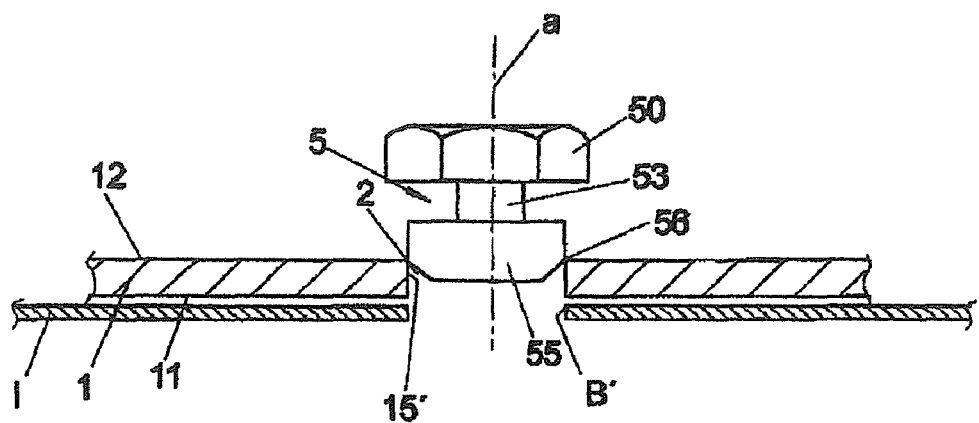
FIG. 7 shows a first modification of the arrangement of FIG. 3a to 3c.

FIG. 7 shows a modification of the arrangement of FIGS. 5a to 5c, the fastening element 5 shown in FIG. 7 also comprising a fastening head 55, which is designed to be rectangular in cross section, and which in the mounted position of the fastening element 5 shown in FIG. 7, engages in an associated through-opening 15' of the unit carrier 1 which is also rectangular in cross section, and which is provided to be transferred into a fastened position, in which it overlaps at the edge a fastening opening B' provided in the door inner skin I, which is also rectangular in cross section and substantially congruent with the through-opening 15'.

In contrast to the arrangement of FIGS. 5a to 5c, however, in this case no guide region is provided for receiving the fastening element 5, but said fastening element is instead integrally formed (injection-molded) in the region of its fastening head 55 at the edge of the through-opening 15' of the unit carrier 1. The connecting region along which the fastening element 5 (on the fastening head 55 thereof) is integrally connected to the unit carrier 1 (at the edge of the through-opening 15') is in this case configured as a predetermined breaking region. In other words, with an actuation of the fastening element 5 on its actuating head 50 by means of an associated tool, in order to displace the fastening element 5 initially in the axial direction a, until the shank 53 thereof penetrates the through-opening 15' as well as the fastening opening B' and the fastening head thereof is located on the other side of the fastening opening B', the connection between the fastening element 5 and the unit carrier 1 is broken.

The through-passage 2 is in this case, therefore, only formed by the through-opening 15'.

After the fastening element 5 has been displaced in the axial direction a, so that the fastening head 55 thereof is no longer—as in the mounted position shown in FIG. 7—located inside the through-opening 15' of the unit carrier 1, but now instead protrudes from the surface 11 of the unit carrier 1 on the door structure side, and thus on the other side of the fastening opening B' of the door inner skin I, the fastening element 5, as disclosed above with reference to FIGS. 6*a* to 6*c*, is rotated by 180°, so that a bayonet closure is produced according to the manner explained with reference to FIGS. 4*a* to 4*c*.

An advantage of the arrangement shown in FIG. 7 relative to the arrangements shown in FIGS. 1*a* to 6*c*, is that after fastening the unit carrier 1 to the door inner skin I no guide region remains protruding from the second surface 12 of the unit carrier 1, which could possibly prevent further mounting operations.

Figure 8:
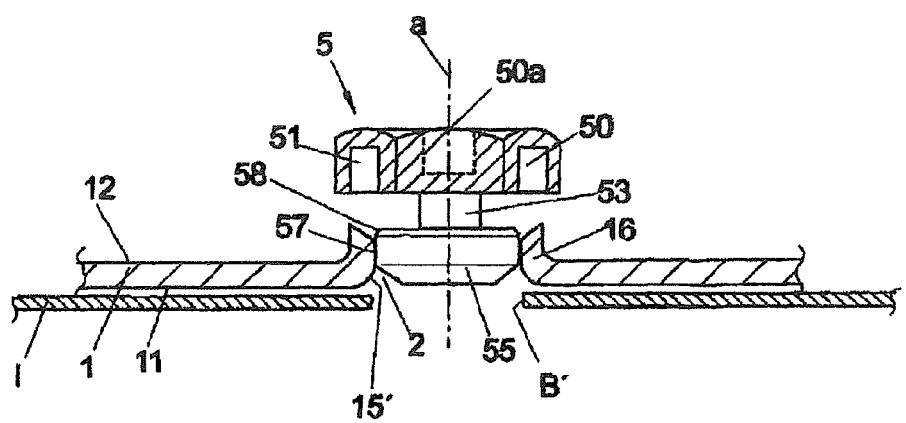
FIG. 8 shows a second modification of the arrangement of FIG. 3a to 3c.

In FIG. 8, a modification of the exemplary embodiment of FIG. 7 is shown, on the unit carrier 1 a guide region 16 aligned with the through-opening 15' being formed, which protrudes from the second surface 12 of the unit carrier 1, but which only extends in the axial direction a to such an extent that only the fastening head 55 of the fastening element 5 provided for producing a bayonet closure may be received therein.

The fastening element 5 which, moreover, coincides with that shown in FIG. 7, in this case has a peripheral recess 51 in its actuating head 50, in addition to an internal polygon 50*a*, in the form of an annular cutout, in which the guide region 16 of the unit carrier 1 is received when the fastening element 5 has been transferred from the mounted position shown in FIG. 8 into its fastened position, in which the shank 53 thereof penetrates the through-opening 15' of the unit carrier 1 as well as the fastening opening B' of the door inner skin I and the fastening head 55 engages behind said fastening opening at its edge. As a result, the guide region 16 does not protrude from the second surface 12 of the unit carrier 1 over the otherwise present actuating head 50 of the actuating element 5.

For retaining the fastening element 5 on the unit carrier 1, more specifically on the guide region 16 thereof, in the mounted position shown in FIG. 8 the fastening head 55 is pressed into the guide region 16 of the unit carrier 1, so that a frictional connection is present between the fastening head 55 of the fastening element 5 and the annular wall forming the guide region 16. Alternatively, a material connection, may also be provided, for example, by an adhesive means or by light welding (by means of ultrasound).

The connection between the fastening head 55 of the fastening element 5 and the guide region 16 of the unit carrier 1 has to be designed such that with the action of a force on the fastening element 5 by a suitable tool, in order to displace said tool in the axial direction a toward its fastened position, the aforementioned connection is canceled.

The fastening head 55 is, moreover, provided with a peripheral phase 58 which is intended to simplify the twisting of the fastening head 55 by 180°, whilst said fastening head (after the axial displacement) bears via the phase 55 against the edge of the fastening opening B' of the door inner skin I.

The invention claimed is:

1. A unit carrier for fitting into a door structure of a motor vehicle door, the unit carrier configured to have functional components of the motor vehicle door premounted thereon, so that the unit carrier, together with the functional components, are configured to be fitted as a door module into the door structure, the unit carrier comprising:
   a first surface of the unit carrier on a door structure side facing the door structure in the fitted state of the unit carrier, and
   fastening elements protruding from a second surface of the unit carrier opposite the first surface, and engaging in associated fastening points of the door structure when the unit carrier is fitted into the door structure to secure the unit carrier to the door structure, wherein the fastening elements are retained in a mounted position on the unit carrier before fitting the unit carrier into the door structure such that the fastening elements do not protrude from the first surface of the unit carrier on the door structure side, and wherein a through-passage is associated with each of the fastening elements on the unit carrier, wherein each of the fastening elements is movable through the respective through-passage into a fastened position, wherein each of the fastening elements protrudes from the first surface of the unit carrier on the door structure side in the fastened position.

2. The unit carrier of claim 1, wherein each of the fastening elements is retained in the mounted position at an edge of the associated through-passage.

3. The unit carrier of claim 1, wherein each fastening element is movable from the mounted position to the fastened position by the action of force on the fastening element.

4. The unit carrier of claim 3, wherein each fastening element is movable from the mounted position to the fastened position by a longitudinal movement of the fastening element.

5. The unit carrier of claim 3, wherein each fastening element is movable from the mounted position to the fastened position by a rotational movement of the fastening element.

6. The unit carrier of claim 2, wherein each fastening element is positively retained at the edge of the associated through-passage.

7. The unit carrier of claim 6, wherein a latching connection is provided for retaining each fastening element.

8. The unit carrier of claim 7, wherein the latching connection comprises a latching device configured to be at least partially elastic, so that the latching connection is releasable by the action of force on the respective fastening element for transferring the fastening element into its fastened position.

9. The unit carrier of claim 7, wherein the latching connection is formed by a latching projection and an associated latching recess.

10. The unit carrier of claim 2, wherein each fastening element is pressed into the through-passage.

11. The unit carrier of claim 2, wherein each fastening element is retained by a material connection at the edge of the through-passage.

12. The unit carrier of claim 2, wherein each fastening element is integrally formed at the edge of the through-passage.

13. The unit carrier of claim 1, wherein on the second surface of the unit carrier remote from the surface on the door structure side, guide regions are provided for receiving at least one portion of each of the fastening elements in its mounted position.

14. The unit carrier of claim 13, wherein each of the guide regions is formed by at least one, at least partially annular, peripheral defining wall defining a space provided for receiving the associated fastening element.

15. The unit carrier of claim 13, wherein the guide regions protrude from the second surface of the unit carrier.

16. The unit carrier of claim 13, wherein the through-passages of the unit carrier are formed by the guide regions together with through-openings of the unit carrier, wherein each through-opening of the unit carrier is aligned with one respective guide region.

17. The unit carrier of claim 13, wherein each of the fastening elements is retained on the associated guide region.

18. The unit carrier of claim 16, wherein each the fastening elements is retained on one respective through-opening of the unit carrier.

19. The unit carrier of claim 1, wherein each of the fastening elements is configured for engagement in an associated fastening opening of the door structure.

20. The unit carrier claim 19, wherein each of the fastening elements overlaps in the fastened position the respective associated fastening opening with a fastening portion of the fastening element at the edge of the fastening opening.

21. The unit carrier of claim 1, wherein each fastening element is movable from the mounted position into the fastened position by a rotational movement.

22. The unit carrier of claim 21, wherein each fastening element is movable by the rotational movement into a rotational position, wherein in the rotational position the fastening element overlaps an associated non-rotationally symmetrical fastening opening at an edge of the fastening opening.

23. The unit carrier of claim 22, wherein each fastening element is configured to form a bayonet closure.

24. The unit carrier of claim 1, further comprising rotational movement limiters of the respective fastening elements in their fastened position.

25. The unit carrier of claim 24, wherein the rotational movement limiters of each fastening element comprise mutually associated stops on the through-passage and on the fastening element.

26. The unit carrier of claim 25, wherein at least one portion of each of the stops is configured to be elastic to overcome rotational locking of the fastening element by applying a sufficiently large torque on the fastening element in order to be able to move the fastening element once again from its fastened position into its mounted position.

27. The unit carrier of claim 1, wherein the unit carrier consists of plastics.

28. The unit carrier of claim 1, wherein the door structure comprises a door inner skin to which the unit carrier is fastened.

* * * * *